United States Patent
Taguchi

(10) Patent No.: US 10,445,793 B2
(45) Date of Patent: Oct. 15, 2019

(54) REVIEW TEXT OUTPUT SYSTEM AND REVIEW TEXT OUTPUT METHOD

(71) Applicant: Rakuten, Inc., Tokyo (JP)

(72) Inventor: Yusuke Taguchi, Tokyo (JP)

(73) Assignee: Rakuten, Inc., Tokyo (JP)

( * ) Notice: Subject to any disclaimer, the term of this patent is extended or adjusted under 35 U.S.C. 154(b) by 333 days.

(21) Appl. No.: 15/138,175

(22) Filed: Apr. 25, 2016

(65) Prior Publication Data
US 2016/0343046 A1 Nov. 24, 2016

Related U.S. Application Data

(63) Continuation-in-part of application No. 14/122,675, filed as application No. PCT/JP2012/071913 on Aug. 29, 2012, now abandoned.

(30) Foreign Application Priority Data

Oct. 28, 2011 (JP) .................................. 2011-237974

(51) Int. Cl.
*G06Q 30/02* (2012.01)
(52) U.S. Cl.
CPC ................................ *G06Q 30/0282* (2013.01)
(58) Field of Classification Search
CPC .................................................. G06Q 30/0282
USPC .................. 705/26.1, 27.1, 26.61, 26.7
See application file for complete search history.

(56) References Cited

U.S. PATENT DOCUMENTS

| | | | | |
|---|---|---|---|---|
| 5,331,554 | A * | 7/1994 | Graham | G06F 17/30259 |
| 5,943,670 | A * | 8/1999 | Prager | G06F 17/30705 |
| 7,313,571 | B1 * | 12/2007 | Platt | G06F 16/683 |
| 7,827,125 | B1 * | 11/2010 | Rennison | G06F 17/3066 706/14 |
| 7,870,031 | B2 * | 1/2011 | Bolivar | G06Q 30/02 705/26.1 |
| 7,930,255 | B2 * | 4/2011 | Choi | G06Q 10/10 705/319 |

(Continued)

*Primary Examiner* — Alexis M Casey
(74) *Attorney, Agent, or Firm* — HEA Law PLLC

(57) ABSTRACT

For making it possible to output a review text beneficial to a search user, a review text output system includes: at least one processor; and at least one memory storing a plurality of instructions that, when executed by the at least one processor, cause the at least one processor to perform operations including: obtaining a first condition, which is a search condition for searching one or more commercial transaction objects; obtaining a second condition, which is a search condition for searching one or more commercial transaction objects; identifying one or more first review texts about one or more commercial transaction objects that satisfy the first condition and one or more second review texts about one or more commercial transaction objects that satisfy the second condition, the first review texts and the second review texts being created by a common reviewer; and outputting the second review texts. The first condition indicates a commercial transaction object related to a search user review text which has already been created by a search user. The identification of the first review texts and the second review texts includes a calculation of a degree of similarity between the search user review text and the first review texts and an identification of the first review texts and the second review texts based on the degree of similarity.

8 Claims, 14 Drawing Sheets

(56) References Cited

U.S. PATENT DOCUMENTS

| | | | | |
|---|---|---|---|---|
| 8,001,105 B2* | 8/2011 | Bolivar | ............ | G06Q 30/02 |
| | | | | 707/709 |
| 8,407,105 B2* | 3/2013 | Linden | ............ | G06Q 30/02 |
| | | | | 705/14.53 |
| 9,767,204 B1* | 9/2017 | Hoover | ............ | G06F 17/30867 |
| 9,767,417 B1* | 9/2017 | Hoover | ............ | G06N 7/02 |
| 2006/0110029 A1* | 5/2006 | Kazui | ............ | G06K 9/00228 |
| | | | | 382/159 |
| 2006/0245572 A1* | 11/2006 | Asher | ............ | G06F 17/30241 |
| | | | | 379/220.01 |
| 2010/0325135 A1* | 12/2010 | Chen | ............ | G10H 1/0008 |
| | | | | 707/759 |
| 2012/0130863 A1* | 5/2012 | Tedjamulia | ............ | G06Q 30/0224 |
| | | | | 705/27.1 |
| 2014/0074269 A1* | 3/2014 | Weston | ............ | G06Q 30/0282 |
| | | | | 700/94 |

\* cited by examiner

FIG.9

|  | WINE A | WINE B |
|---|---|---|
| KEN | WINE A  SHOP X  3,400 YEN | WINE B  SHOP Z  2,800 YEN |
|  | RANK★★★★☆  VERY TASTY. | RANK★★☆☆☆  TOO LIGHT FOR ME. |
| MIKE | WINE A  SHOP Y  3,300 YEN | WINE B  SHOP X  2,900 YEN |
|  | RANK★★★★★  AROMATIC. | RANK★★★★☆  WELL BALANCED. |
| TARO | WINE A  SHOP Y  3,300 YEN | WINE B  SHOP Z  2,800 YEN |
|  | RANK★★★★★  QUITE SATISFIED. | RANK★★★☆☆  I PREFER A FULLER BODY THAN THIS WINE. |

|  | WINE A | WINE B |
|---|---|---|
| BILL | WINE A  SHOP Z  3,200 YEN | GILL  WINE B  SHOP β  3,000 YEN |
|  | RANK★★★☆☆  INEXPENSIVE. | RANK★★★★☆  BEST BALANCED! |
| JOHN | WINE A  SHOP α  3,500 YEN | BOB  WINE B  SHOP X  2,900 YEN |
|  | RANK★★★★☆  GOOD. | RANK★★☆☆☆  RATHER LIGHT. |
| EMI | WINE A  SHOP X  3,400 YEN | KEVIN  WINE B  SHOP X  2,900 YEN |
|  | RANK★★★☆☆  SO-SO. | RANK★★★★☆  GOES WELL WITH PASTA. |

FIG.11

| MERCHAN-DISE ID | GENRE 1 | GENRE 2 | GENRE 3 | MERCHAN-DISE NAME | PRICE | SHOP | DESCRIP-TION |
|---|---|---|---|---|---|---|---|
| 0001 | LIQUORS | WINES | FRENCH WINES | WINE A | 3400 | X | ---- |
| 0002 | LIQUORS | WINES | FRENCH WINES | WINE A | 3300 | Y | ---- |
| 0003 | LIQUORS | WINES | FRENCH WINES | WINE B | 2400 | X | ---- |

FIG.12

| REVIEW TEXT ID | USER ID OF REVIEWER | USER NAME | MERCHAN-DISE ID | REVIEW TEXT | DISCLO-SURE | PURCHASER FLAG |
|---|---|---|---|---|---|---|
| R0001 | U0100 | Ken | 0001 | ---- | 1 | 1 |
| R0002 | U0150 | Taro | 0083 | ---- | 1 | 1 |
| R0003 | U0200 | Bill | 0042 | ---- | 0 | 1 |

FIG.13

| MERCHAN-DISE ID | REVIEW TEXT ID | HITS |
|---|---|---|
| 0001 | R0001, R0034, R0043, -------- | 332 |
| 0002 | R0002, R0020, R0021, -------- | 239 |
| 0003 | R0003, R0050, R0062, -------- | 190 |

FIG.17

| WINE A | FRENCH WINE (GENRE) |
|---|---|
| KEN | |
| WINE A  SHOP X  3,400 YEN | WINE B  SHOP Z  2,800 YEN |
| RANK★★★★☆<br>VERY TASTY. | RANK★★☆☆☆<br>TOO LIGHT FOR ME. |
| | WINE C  SHOP Y  3,500 YEN |
| | RANK★★★★★<br>BEST WINE! |
| 70 | WINE D  SHOP α  2,000 YEN |
| | RANK★★★☆☆<br>GOOD COST PERFORMANCE. |
| MIKE | |
| WINE A  SHOP Y  3,300 YEN | WINE B  SHOP X  2,900 YEN |
| RANK★★★★★<br>AROMATIC. | RANK★★★★☆<br>WELL BALANCED. |
| | WINE E  SHOP β  4,000 YEN |
| 70 | RANK★★★★★<br>BEST WINE EVER. |

FIG.18

| MERCHAN-DISE ID | GENRE 1 | GENRE 2 | GENRE 3 | MERCHAN-DISE NAME | PRICE | SHOP | DESCRIP-TION | REPLACE-MENT |
|---|---|---|---|---|---|---|---|---|
| 0001 | LIQUORS | WINES | FRENCH WINES | WINE A | 3400 | X | — | 1 |
| 0002 | LIQUORS | WINES | FRENCH WINES | WINE A | 3300 | Y | — | 1 |
| 0003 | LIQUORS | WINES | FRENCH WINES | WINE B | 2400 | X | — | 1 |
| 0900 | HOUSEHOLD APPLIANCES | CAMERAS | DIGITAL SLRS | CAMERA P | 158000 | M | — | 0 |
| 0901 | HOUSEHOLD APPLIANCES | CAMERAS | DIGITAL SLRS | CAMERA Q | 245000 | N | — | 0 |

FIG.19

| BOB | | | | | |
|---|---|---|---|---|---|
| WINE A | SHOP X | 3,400 YEN | WINE B | SHOP α | 2,700 YEN |

(Review text for WINE A contains highlighted words: GOOD, EASY)
(Review text for WINE B contains highlighted words: BAD, INEXPENSIVE)

FIG.20

START
↓
S301: PERFORM MORPHOLOGICAL ANALYSIS ON BOTH REVIEW TEXTS
↓
S302: EXTRACT WORD OF SPECIFIC PART OF SPEECH FROM FIRST REVIEW TEXT
↓
S303: WHEN EXTRACTED WORD IS NOT FOUND IN SECOND REVIEW TEXT, HIGHLIGHT EXTRACTED WORD
↓
S304: EXTRACT WORD OF SPECIFIC PART OF SPEECH FROM SECOND REVIEW TEXT
↓
S305: WHEN EXTRACTED WORD IS NOT FOUND IN FIRST REVIEW TEXT, HIGHLIGHT EXTRACTED WORD
↓
END

REVIEW TEXT OUTPUT SYSTEM AND REVIEW TEXT OUTPUT METHOD

CROSS REFERENCE TO RELATED APPLICATIONS

This patent application is a continuation-in-part of copending U.S. patent application Ser. No. 14/122,675 filed as international application No. PCT/JP2012/071913 on Aug. 29, 2012,

TECHNICAL FIELD

The present invention relates to a review text output system, and a review text output method, and more particularly, to outputting review texts about commercial transaction objects such as merchandise, services, and information.

BACKGROUND ART

In the field of electronic commercial transaction, some Web pages for selling merchandise bear review texts about the article of merchandise, or include a link to a Web page that bears review texts about the article of merchandise. A review text is a piece of writing written as feedback or an evaluation on an article of merchandise, and is created by a user (reviewer) of an electronic commercial transaction system to be posted to the system. In JP2011-154527A, a similar system is disclosed. A user who reads review texts can know what evaluations have been made on an article of merchandise by other users, and put the evaluations to use in selecting merchandise for himself/herself.

SUMMARY OF INVENTION

An object of the present invention is to provide a review text output system, and a review text output method, which can output a review text which is beneficial to a search user.

A review text output system according to an aspect of the present invention includes: at least one processor; and at least one memory storing a plurality of instructions that, when executed by the at least one processor, cause the at least one processor to perform operations including: obtaining a first condition, which is a search condition for searching one or more commercial transaction objects; obtaining a second condition, which is a search condition for searching one or more commercial transaction objects; identifying one or more first review texts about one or more commercial transaction objects that satisfy the first condition and one or more second review texts about one or more commercial transaction objects that satisfy the second condition, the first review texts and the second review texts being created by a common reviewer; and outputting the second review texts. The first condition indicates a commercial transaction object related to a search user review text which has already been created by a search user. The identification of the first review texts and the second review texts includes a calculation of a degree of similarity between the search user review text and the first review texts and an identification of the first review texts and the second review texts based on the degree of similarity.

A review text output method according to an aspect of the present invention, includes: a step of obtaining a first condition, which is a search condition for searching commercial transaction objects, using at least one processor; a step of obtaining a second condition, which is a search condition for searching commercial transaction objects, using the at least one processor; a step of identifying one or more first review texts about one or more commercial transaction objects that satisfy the first condition and one or more second review texts about one or more commercial transaction objects that satisfy the second condition using the at least one processor, the first review texts and the second review texts being created by a common reviewer; and a step of outputting the second review texts using a display. The first condition indicates a commercial transaction object related to a search user review text which has already been created by a search user. In the step of identifying, the first review texts and the second review texts are identified based on a degree of similarity between the search user review text and the first review texts.

BRIEF DESCRIPTION OF DRAWINGS

FIG. 9 A diagram illustrating an example of an extended review text search result page which is provided by the electronic commercial transaction server system.

FIG. 10 A diagram illustrating an appendix to the extended review text search result page which is provided by the electronic commercial transaction server system.

FIG. 11 A diagram illustrating the configuration of a merchandise database.

FIG. 12 A diagram illustrating the configuration of a review text database.

FIG. 13 A diagram illustrating the configuration of a merchandise item-based review text list.

FIG. 17 A diagram illustrating a modification example of the extended review text search result page.

FIG. 18 A diagram illustrating the configuration of a merchandise database according to a modification example.

FIG. 19 A diagram illustrating a modification example of a review comparison field.

FIG. 20 A flow chart illustrating processing of generating data for the review comparison field according to the modification example.

DESCRIPTION OF EMBODIMENTS

An embodiment of the present invention is described below in detail with reference to the drawings.

Figure 1:
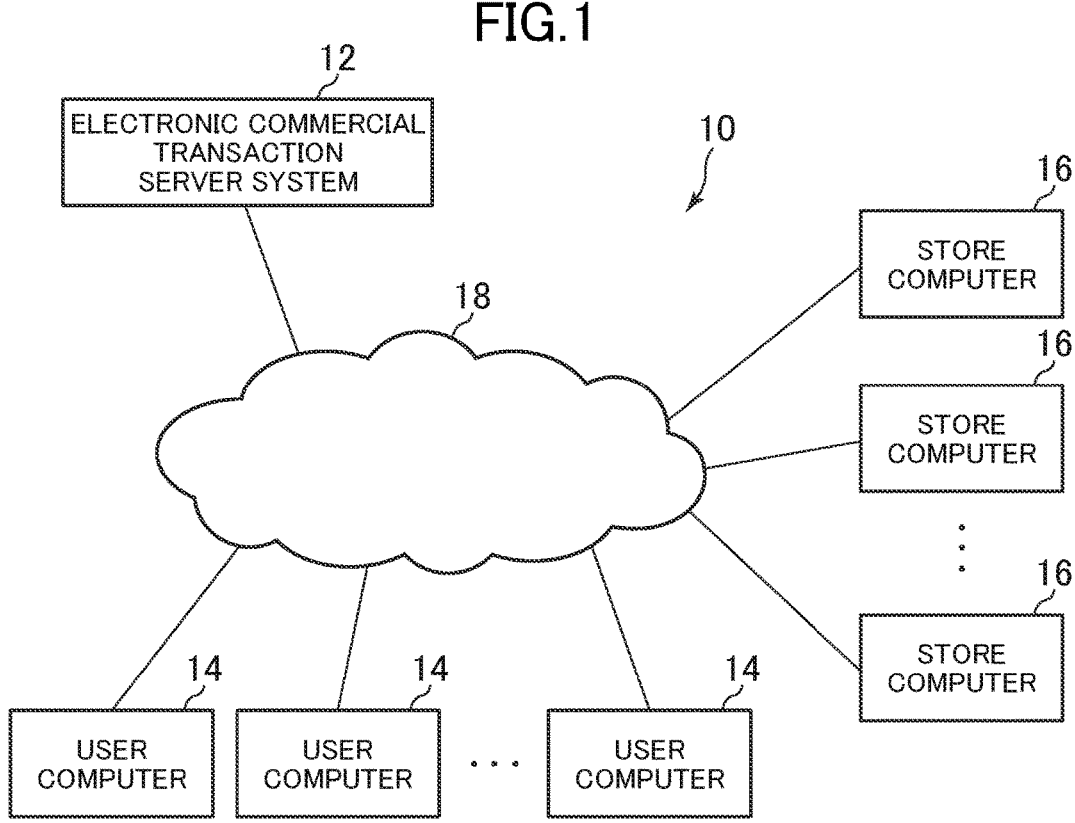
FIG. 1 An overall view of a computer network that includes an electronic commercial transaction server system according to an embodiment of the present invention.

FIG. 1 is an overall view of a computer network 10 which includes an electronic commercial transaction server system 12 according to the embodiment of the present invention. As illustrated in FIG. 1, the computer network 10 includes the electronic commercial transaction server system 12, a plurality of user computers 14, and a plurality of store computers 16. The electronic commercial transaction server system 12 is made up of a single computer (server) or a plurality of computers (servers), and is connected to a wide area network 18, which is the Internet or the like. The electronic commercial transaction server system 12 provides a virtual shopping mall service for users of the user computers 14 and the store computers 16 to buy and sell merchandise. The electronic commercial transaction server system 12 has a function of registering and outputting a review text about merchandise, and represents the review text output system according to a mode of the present invention.

Each of the user computers 14 is a computer used by a user who purchases merchandise, and is connected to the wide area network 18 by cable or wireless connection to hold data communication to/from the electronic commercial transaction server system 12. The user computer 14 is, for example, a personal computer or a portable terminal such as a cellular phone or a smartphone, and includes input means such as a keyboard and/or a pointing device and display means such as an LDC. A Web browser is installed in the user computer 14 and enables the user computer 14 to access the electronic commercial transaction server system 12 via the wide area network 18 in order to transmit various types of data to the electronic commercial transaction server system 12 and display a Web page provided by the electronic commercial transaction server system 12. The user computer 14 uses the Web browser to purchase desired merchandise, or to create data of a review text (writing that conveys an evaluation or feedback on a review subject) about purchased merchandise (a review subject) and register the created data in the electronic commercial transaction server system 12. The Web browser can also be used to receive review text data created by other users from the electronic commercial transaction server system 12 and display the data.

Each of the store computers 16 is a computer used by a user who sells merchandise, and is connected to the wide area network 18 by cable or wireless connection to hold data communication to/from the electronic commercial transaction server system 12. The store computer 16 is, for example, a personal computer, and includes input means and display means. The store computer 16, too, can be a portable terminal such as a cellular phone or a smartphone, of course. A Web browser is installed in the store computer 16 as well to enable the store computer 16 to access the electronic commercial transaction server system 12 via the wide area network 18 in order to register information of merchandise for sale.

Figure 2:
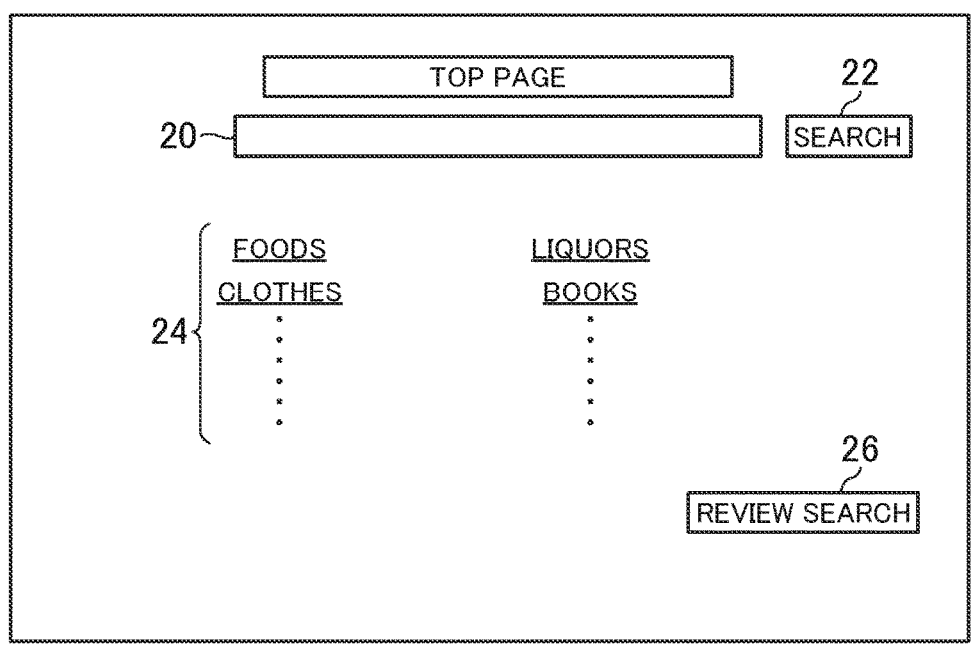
FIG. 2 A diagram illustrating an example of a top page which is provided by the electronic commercial transaction server system.

FIG. 2 is a diagram illustrating a top page of the virtual shopping mall provided by the electronic commercial transaction server system 12. The top page is in a Web page format, and is displayed based on data that is transmitted from the electronic commercial transaction server system 12 in response to a request from the user computer 14. As illustrated in FIG. 2, an entry form 20, a search button 22, a merchandise genre button group 24, and a review search button 26 are displayed on the top page. The review search button 26 is a button for requesting a Web page on which a review text search condition is entered as described later. The entry form 20 is a field where the user enters a merchandise search condition via the input means. In this embodiment, the user enters a letter string that is included in a merchandise name in the entry form 20.

The search button 22 is a button for transmitting a merchandise search request, which contains a letter string entered in the entry form 20, from the user computer 14 to the electronic commercial transaction server system 12, and is clicked with the pointing device. In response to the merchandise search request, the electronic commercial transaction server system 12 searches a merchandise database for merchandise whose merchandise name includes the letter string contained in the request, and transmits data (not shown) of a Web page that shows results of the search to the user computer 14.

The merchandise genre button group 24 includes merchandise genre buttons corresponding respectively to a plurality of merchandise genres such as "foods", "liquors", "clothes", and "books". With a click of a merchandise genre button, the user computer 14 displays a Web page (not shown) that contains subordinate merchandise genre names belonging to a merchandise genre that corresponds to the clicked button. Subsequently clicking on the button of a merchandise genre at the bottom causes the user computer 14 to display a Web page that contains descriptions of articles of merchandise belonging to the merchandise genre.

Figure 3:
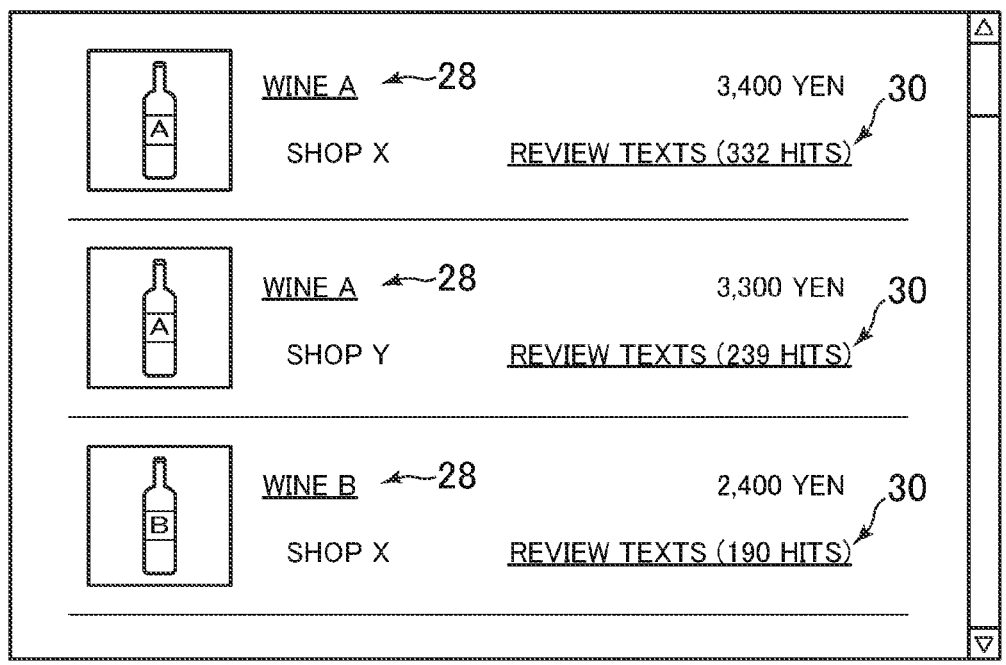
FIG. 3 A diagram illustrating an example of a merchandise list page which is provided by the electronic commercial transaction server system.
Figure 4:
FIG. 4 A diagram illustrating an example of an individual merchandise item review text page which is provided by the electronic commercial transaction server system.

FIG. 3 illustrates a merchandise list page that is displayed by the display means of the user computer 14 when the user selects a root merchandise genre "liquors", an intermediate merchandise genre "wines", and a sub-merchandise genre "French wines" in the order stated. The merchandise list page illustrated in FIG. 3 displays, for each article of merchandise belonging to the sub-merchandise genre "French wines", an image of the merchandise, the merchandise name, the names of stores selling the merchandise, prices, and the count of registered review texts. The merchandise name is displayed by a merchandise button 28. The review text count is displayed by a "display review texts" button 30. By clicking on the "display review texts" button 30, an individual merchandise item review text page illustrated in FIG. 4 is displayed on the user computer 14. A click of the merchandise button 28 causes the user computer 14 to display an individual merchandise item page illustrated in FIG. 5.

Figure 5:
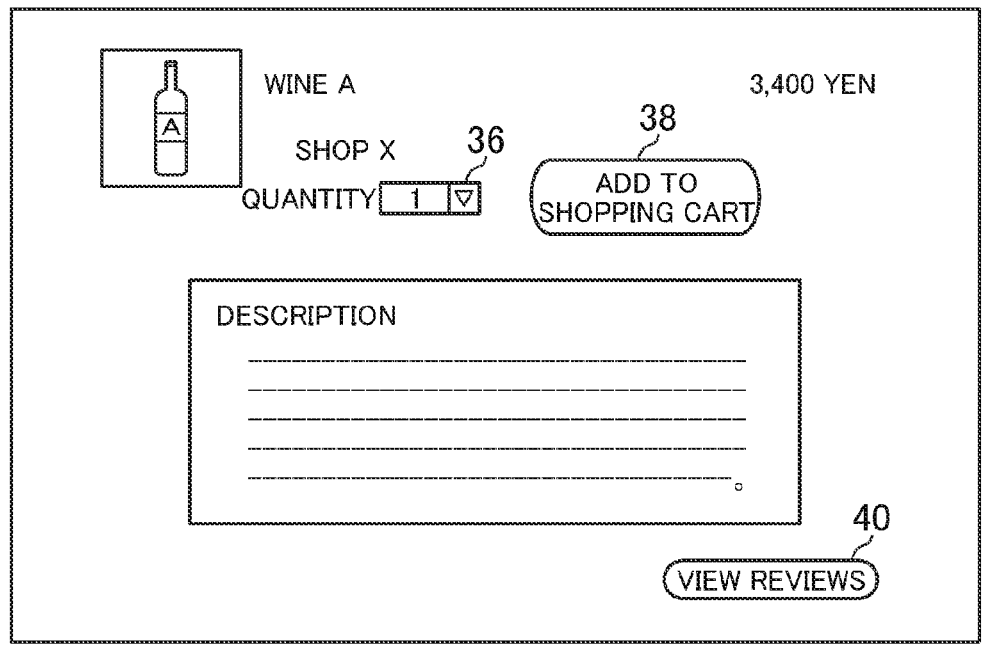
FIG. 5 A diagram illustrating an example of an individual merchandise item page which is provided by the electronic commercial transaction server system.

On the individual merchandise item review text page of FIG. 4, a merchandise description field 32 for merchandise that is the subject of a review text (review subject) is placed at the top of the page, and many review fields 34 which display reviews created and registered by users (reviewers) are placed below the merchandise description field 32. The merchandise description field 32 displays the merchandise name, the name of a store selling the merchandise, and a price. The merchandise name is designed as a button, and the individual merchandise item page of FIG. 5 is displayed on the user computer 14 also by clicking on the button. Each of the review fields 34 displays the name (nickname) of a user who is the reviewer, an image that indicates an evaluation value given by the reviewer on the review subject, and a review text. However, the electronic commercial transaction server system 12 is configured so that a reviewer can specify whether or not to disclose the name (nickname) of the reviewer when registering a review text in the electronic commercial transaction server system 12, and the name of a reviewer who has specified not to disclose the name is not displayed in the review field 34. In this case, a special name determined in advance such as "purchaser" in FIG. 4 may be displayed instead. If inclined to purchase the merchandise displayed in the merchandise description field 32 as a result of reading the review fields 34, the user can view the individual merchandise item page immediately by clicking on the merchandise name button that is included in the merchandise description field 32.

The individual merchandise item page of FIG. 5 displays an image of the merchandise, the merchandise name, the name of a store selling the merchandise, a price, and a description of the merchandise. The page also displays a pull-down menu 36 for entering the order quantity, a "shopping cart" button 38, and a button 40 for displaying the individual merchandise item review text page of FIG. 4. When deciding to purchase based on the merchandise description and other types of information, the user sets the order quantity with the use of the pull-down menu 36 and then clicks on the "shopping cart" button 38. In response, the electronic commercial transaction server system 12 stores the order quantity and the merchandise ID of the ordered merchandise in association with the communication session, and returns a Web page (not shown) for establishing the order to the user computer 14. On the Web page for establishing the order, the user enters a user ID, a password, and other types of necessary information such as the shipping address and a settlement method, and then presses an "OK" button. Consequently, the entered information is transmitted to the electronic commercial transaction server system 12, and the order related to the order quantity and the merchandise ID that have already been stored in association with the communication session is established.

Figure 6:
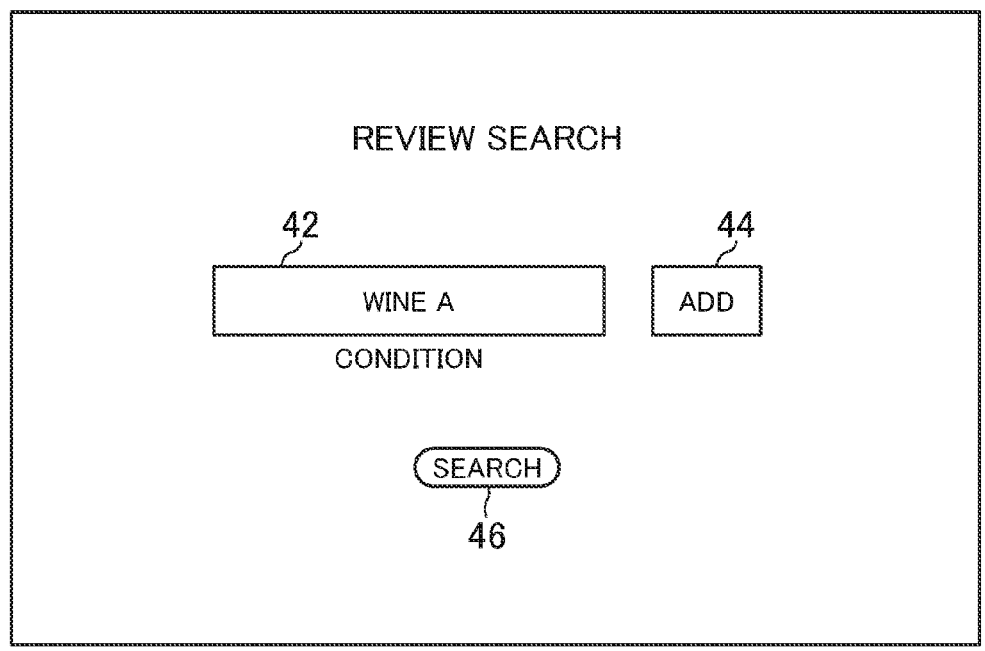
FIG. 6 A diagram illustrating an example of a review text search condition entry page which is provided by the electronic commercial transaction server system.
Figure 7:
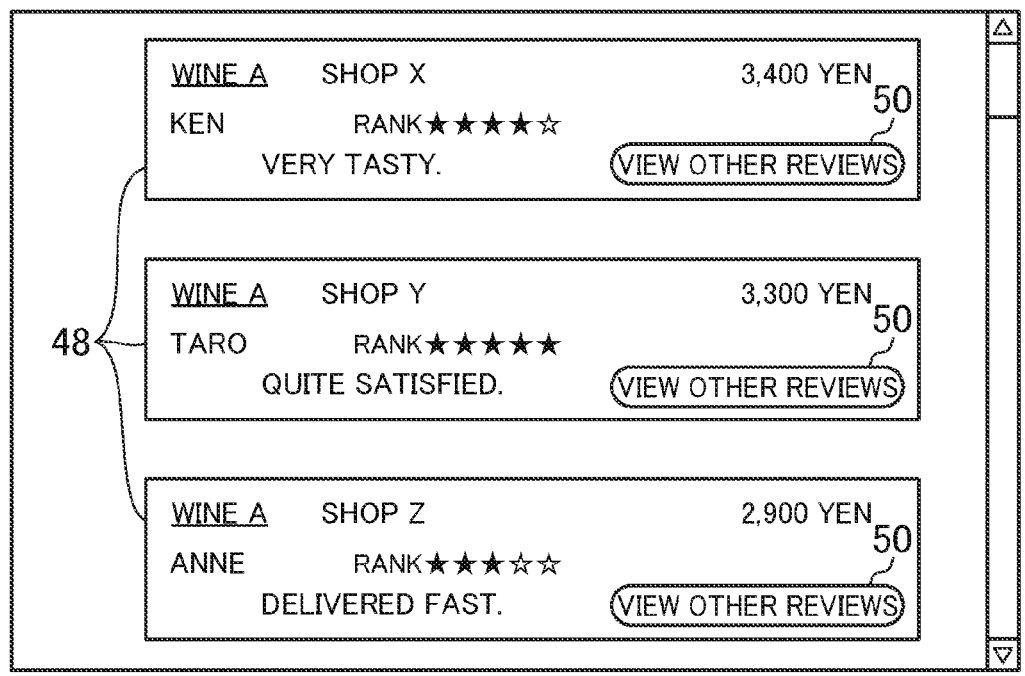
FIG. 7 A diagram illustrating an example of a review text search result page which is provided by the electronic commercial transaction server system.

When the review search button 26 is clicked on the top page of FIG. 2, a review text search condition entry page illustrated in FIG. 6 is displayed on the user computer 14. The Web page of FIG. 6 displays an entry form 42, an "add" button 44, and a "search" button 46. The entry form 42 is a field where the user enters a search condition for searching for merchandise that is the review subject of a review text. In this embodiment, the user enters a letter string that is included in a merchandise name in the entry form 42. When the user enter an arbitrary letter string in the entry form 42 and clicks on the "search" button 46, the electronic commercial transaction server system 12 searches the merchandise database for merchandise whose merchandise name includes the letter string. The electronic commercial transaction server system 12 returns review texts that have the found articles of merchandise as the review subject to the user computer 14 in a Web page format. FIG. 7 illustrates a review text search result page displayed at this point on the user computer 14. As illustrated in FIG. 7, one or more review fields 48 which respectively display review texts found as a result of the search are arranged on this page. Each of the review fields 48 displays, in addition to a review text found as a result of the search, an image that indicates an evaluation value given by the reviewer on the review subject, and the name of a user who is the reviewer, the merchandise name of the merchandise that is the review subject of the review text in question, the name of a store selling the merchandise, and a price. One review field 48 is provided for each article of merchandise whose merchandise name includes a letter string entered in the entry form 42 (FIG. 6), and each review field 46 displays, as a representative, one of review texts that have the merchandise in question as the review subject. Which review text is to be displayed in the review field 48 may be selected in accordance with various standards, for example, the created date, the letter count, or the degree of similarity between the reviewer and the user, or may be selected at random. The review field 48 also displays a button 50 which, when clicked by the user, causes the user computer 14 to display other review texts about the same merchandise.

Figure 8:
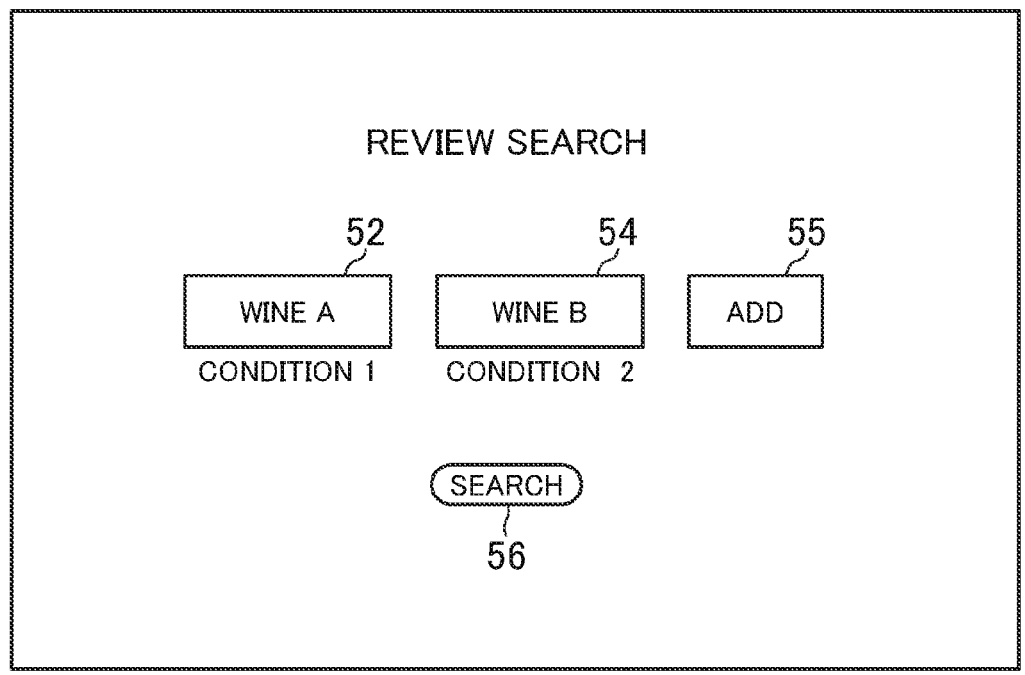
FIG. 8 A diagram illustrating an example of an extended review text search condition entry page which is provided by the electronic commercial transaction server system.

When the "add" button 44 is clicked on the review text search condition entry page of FIG. 6, an extended review text search condition entry page illustrated in FIG. 8 is displayed. This Web page is one of features of this embodiment, and displays two entry forms 52 and 54 and one "search" button 56. The extended review text search condition entry page also displays an "add" button 55, which is clicked in order to further increase entry forms in number. The entry forms 52 and 54 are fields where the user enters Condition 1 and Condition 2, respectively, which are each a search condition for merchandise that is a review subject. In this embodiment, the user enters letter strings included in merchandise names in the entry forms 52 and 54. When the user enters letter strings in the two entry forms 52 and 54 and then clicks on the "search" button 56, the electronic commercial transaction server system 12 receives and thus obtains Conditions 1 and 2 described above, generates data for an extended review text search result page illustrated in FIG. 9, and returns the data to the user computer 14.

The extended review text search result page of FIG. 9 displays a review comparison field 58 for each reviewer. Displayed at the head of each review comparison field 58 is the name of a user who is the reviewer. Two review fields are displayed in association with each other below the name of the user. Specifically, two review fields are arranged side by side.

Each review field displays the merchandise name of merchandise that is the review subject, the name of a store selling the merchandise, and a price in the upper half, and displays a review text in the lower half. The review field placed on the left-hand side of FIG. 9 is about merchandise whose merchandise name includes a letter string entered in the entry form 52 (FIG. 8) (Condition 1). The review field placed on the right-hand side of FIG. 9 is about merchandise whose merchandise name includes a letter string entered in the entry form 54 (FIG. 8) (Condition 2). Review texts written in the left and right review fields discuss different review subjects but are created and registered by the same reviewer. In order to illustrate that the left-hand side review field corresponds to Condition 1 whereas the right-hand side review field corresponds to Condition 2, a letter string "Wine A" of Condition 1 and a letter string "Wine B" of Condition 2 are displayed side by side at the top of the extended review text search result page.

In short, entering an arbitrary letter string as Condition 1 in the entry form 52 on the Web page of FIG. 8 causes the extended review text search result page of FIG. 9 to display a review text that has, as the review subject, merchandise whose merchandise name includes the entered letter string in the review field that is placed on the left-hand side of each review comparison field 58. Entering an arbitrary letter string as Condition 2 in the entry form 54 on the Web page of FIG. 8 causes the Web page of FIG. 9 to display a review text that has, as the review subject, merchandise whose merchandise name includes the entered letter string in the review field that is placed on the right-hand side of each review comparison field 58. The review fields which are horizontally adjacent to each other display review texts created and registered by the same reviewer. According to this embodiment, the user can easily read and compare review texts created and registered by the same reviewer out of review texts about merchandise whose merchandise name includes a letter string set as Condition 1 and review texts about merchandise whose merchandise name includes a letter string set as Condition 2. The user can thus easily know what evaluation or feedback has been given on two articles of merchandise that the user is interested in by one reviewer, and put the evaluation or feedback to use in selecting merchandise.

The display format of the review comparison field 58 is not limited to the one illustrated in FIG. 9. It is sufficient if review texts by the same reviewer which correspond to different conditions are output in association with each other. For instance, the review texts may be arranged on top of each other. Alternatively, a link button may be displayed in the periphery of one of the review texts so that the other review text is displayed by clicking on the link button. Frame lines illustrated in FIG. 9 are not indispensable. In the case where one or both of conditions have a plurality of review texts that correspond to the condition, only some (for example, one) of the plurality of review texts may be displayed on the extended review text search result page, or all of the plurality of review texts may be displayed on the extended review text search result page. In the case of displaying a plurality of review texts that correspond to one search condition in a review field, the merchandise names, the names of stores selling the merchandise, prices, and review texts are arranged next to one another in the vertical direction or the horizontal direction (see FIG. 17).

Specifically, a plurality of review texts created by "Ken" may be found as a result of a search that uses a letter string "Wine A" as Condition 1. For instance, one reviewer may create review texts a plurality of times about "Wine A" sold at one store, or may create a review text about "Wine A" for each of different stores that sell "Wine A". In the case where the same reviewer has created a plurality of review texts about merchandise that meets a condition as this, all of the review texts can be displayed in association with one another by, for example, aligning the review texts in a single line. Alternatively, only some of the review texts (e.g., the one created last) may be displayed on the extended review text search result page. In this case, a button bearing a letter string "view more" or the like is provided so that the rest of the review texts are displayed by clicking on the button.

Review texts that have, as the review subject, merchandise that satisfies Condition 1 may include one whose reviewer has not created or registered a review text about merchandise that satisfies Condition 2. There is also the reverse case where review texts that have, as the review subject, merchandise that satisfies Condition 2 include one whose reviewer has not created or registered a review text about merchandise that satisfies Condition 1. Therefore, as illustrated in FIG. 10, review fields displaying review texts that fit into the former case may be arranged on top of one another on one of the left-hand side and the right-hand side (the left-hand side in FIG. 10), while review fields displaying review texts that fit into the latter case are arranged on top of one another on the other side (the right-hand side in FIG. 10) at the same time. The Web page of FIG. 10 may be a part (e.g., the bottom) of the extended review text search result page of FIG. 9, or may be a separate Web page linked to the page of FIG. 9.

A detailed description is given below on information processing executed in the electronic commercial transaction server system 12, in particular, information processing for generating data of the extended review text search result page and returning the data to the user computer 14. The configuration and information processing of the electronic commercial transaction server system 12 described herein are implemented by a program that is run on the electronic commercial transaction server system 12. This program may be downloaded from another computer via the wide area network 18, or may be read out of a computer-readable information storage medium such as a DVD-ROM or a CD-ROM.

A plurality of types of databases stored in a large-scale storage device that is included in the electronic commercial transaction server system 12 are described first. The large-scale storage device may be built inside or separate from a computer that is the center of the electronic commercial transaction server system 12.

FIG. 11 is a diagram schematically illustrating a merchandise database which is included in the electronic commercial transaction server system 12. As illustrated in FIG. 11, the merchandise database stores, for each article of merchandise, a merchandise ID, Genre 1, Genre 2, Genre 3, a merchandise name, a price, the name of a store selling the merchandise, and a merchandise description in association with one another. The merchandise ID is information for uniquely identifying an article of merchandise that is traded in the electronic commercial transaction server system 12. Genre 1 is information for identifying a root merchandise genre such as "liquors" to which merchandise belongs. Genre 2 is information for identifying an intermediate merchandise genre such as "wines" to which merchandise belongs. Genre 3 is information for identifying a sub-merchandise genre such as "French wines" to which merchandise belongs. The merchandise description is information such as the size, weight, and other specifications of the merchandise, a recommendation message from the store selling the merchandise, and an image of the merchandise. A worker of a store who is planning to put new merchandise on sale enters genres as Genre 1, Genre 2, and Genre 3, the merchandise name, a price, and a merchandise description on the store computer 16, following the guidance of a merchandise information entry page (not shown) which is received from the electronic commercial transaction server system 12, and transmits these pieces of information to the electronic commercial transaction server system 12 along with store identification information. The electronic commercial transaction server system 12 newly issues a merchandise ID, and stores the various types of information received from the store computer 16 together with the issued merchandise ID. In this embodiment where a plurality of stores use the electronic commercial transaction server system 12, the same merchandise may be registered by a plurality of stores.

FIG. 12 is a diagram schematically illustrating a review text database which is included in the electronic commercial transaction server system 12. As illustrated in FIG. 12, the review text database stores, for each review text, a review text ID, the user ID of the reviewer, the name of a user who is the reviewer, the merchandise ID of merchandise that is the review subject, a review text, a disclosure flag, and a purchaser flag in association with one another. The review text database may additionally store the date of creation of the review text. The review text ID is information for identifying a review text uniquely throughout the electronic commercial transaction server system 12. The disclosure flag is information indicating whether or not a user who is the reviewer wishes to disclose his/her name as described above, and has a value "1" which indicates that the user wishes to disclose or a value "0" which indicates that the user does not wish to disclose. The review text, which is writing conveying an evaluation or feedback on a review subject as described above, includes here an evaluation value (rank) given by the reviewer on the review subject. The review text may further include a period over which the reviewer has purchased the merchandise, how many times the reviewer has purchased the merchandise, and the total count of pieces of the merchandise that the reviewer has purchased. The purchaser flag indicates whether or not the reviewer has actually purchased the review subject. In the case of displaying a review text that is created by a user who is not a purchaser, a message to that effect is desirably displayed along with the review text based on the purchaser flag.

To create and register a review text, the user computer 14 transmits information for identifying merchandise and an instruction to create a review to the electronic commercial transaction server system 12. The electronic commercial transaction server system 12 transmits to the user computer 14 a review text entry page (not shown) for creating and registering a review text that has the merchandise identified by the merchandise ID in question as the review subject. The user computer 14 enters text information of the review text and a disclosure flag value, following the guidance of the review text entry page, and transmits these pieces of information to the electronic commercial transaction server system 12 along with a user ID and the merchandise ID of the review subject. The electronic commercial transaction server system 12 newly issues a review text ID, and stores the various types of information received from the user computer 14 in the review text database together with the issued review text ID. A user name that is associated with the user ID in this case is obtained from a user database (not shown). FIG. 13 is a diagram schematically illustrating a merchandise item-based review text list which is stored in the large-scale storage device included in the electronic commercial transaction server system 12. The list records, for each merchandise ID, the review text ID of every review text that has merchandise identified by the merchandise ID as the review subject, along with the count of the review text IDs. The list of FIG. 13 is information derived from the review text database of FIG. 12, and is automatically updated by the electronic commercial transaction server system 12 each time the review text database is updated.

The electronic commercial transaction server system 12 refers to the merchandise database, the review text database, and the merchandise item-based review text list to generate data of a Web page to be displayed on the user computer 14. To generate data for the merchandise list page of FIG. 3, for example, the electronic commercial transaction server system 12 extracts from the merchandise database a record in which a sub-merchandise genre specified by the user is recorded as "Genre 3", and obtains an image of the merchandise, the merchandise name, the name of a store selling the merchandise, and a price from the record. The electronic commercial transaction server system 12 also obtains the count of review texts about this merchandise from the merchandise item-based review text list, with a merchandise ID included in the extracted record as a key. Based on the obtained information, the electronic commercial transaction server system 12 composites data for the merchandise list page of FIG. 3.

To generate data for the individual merchandise item review text page of FIG. 4, the electronic commercial transaction server system 12 extracts a record that is stored in the merchandise database in association with the merchandise ID of merchandise specified by the user, and obtains an image of the merchandise, the merchandise name, the name of a store selling the merchandise, and a price from the record. The electronic commercial transaction server system 12 also obtains a review text ID group from the merchandise item-based review text list, with the merchandise ID included in the extracted record as a key. For each obtained review text ID, the electronic commercial transaction server system 12 refers to the review text data base to obtain the user ID of a reviewer, a user name, and a review text that are associated with the review text ID. Based on the thus obtained information, the electronic commercial transaction server system 12 composites data for the individual merchandise item review text page of FIG. 4.

To generate data for the individual merchandise item page of FIG. 5, the electronic commercial transaction server system 12 extracts a record that is stored in the merchandise database in association with the merchandise ID of merchandise specified by the user, and obtains an image of the merchandise, the merchandise name, the name of a store selling the merchandise, a price, and a merchandise description from the record. Based on the thus obtained information, the electronic commercial transaction server system 12 composites data for the individual merchandise item page of FIG. 5.

To generate data for the review text search result page of FIG. 7, the electronic commercial transaction server system 12 extracts from the merchandise database a record in which the merchandise name includes a letter string transmitted from the user computer 14. With a merchandise ID that is included in the extracted record as a key, a review text ID group is obtained from the merchandise item-based document list. The electronic commercial transaction server system 12 refers to the review text database to obtain the user ID of a reviewer, a user name, and a review text that are associated with one of review text IDs in the obtained review text ID group. The selected one of the review text IDs may be a randomly selected ID or may be the ID of a review text that has the latest date of creation. Based on the thus obtained information, the electronic commercial transaction server system 12 composites data for the review text search result page of FIG. 7.

Figure 14:
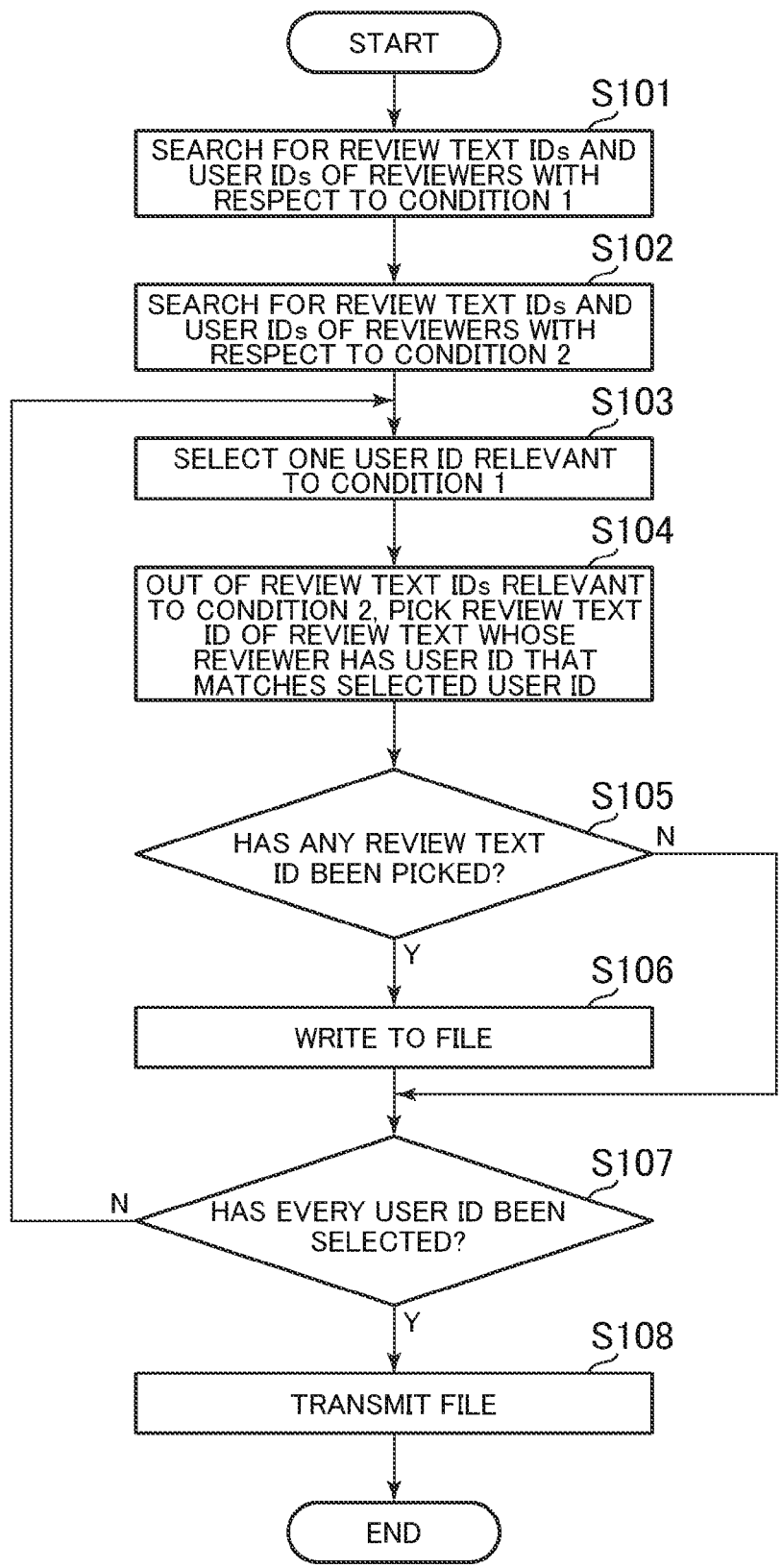
FIG. 14 A flow chart illustrating processing of generating data for the extended review text search result page.

To create data for the review text search result page of FIG. 9, processing illustrated in FIG. 14 is executed. This processing is executed by obtaining in the electronic commercial transaction server system 12 a letter string relevant to Condition 1 and a letter string relevant to Condition 2 which are transmitted from the user computer 14. In this processing, the electronic commercial transaction server system 12 first obtains review text IDs that are related to a letter string entered as Condition 1 on the review text search condition entry page of FIG. 8, and the user IDs of the reviewers (S101). Specifically, the electronic commercial transaction server system 12 first obtains from the merchandise database the merchandise ID of merchandise whose merchandise name includes a letter string entered as Condition 1. The electronic commercial transaction server system 12 next obtains from the review text database a review text ID group that is associated with the obtained merchandise ID. The electronic commercial transaction server system 12 further obtains, from the review text database, for each obtained review text ID, a user ID that is associated with the review text ID and that is included in a record where the flag indicates that the option to "disclose" has been chosen. The user ID that is included in a record where the flag indicates that the option to "disclose" has been chosen is obtained because the review text search result page of FIG. 9 displays a review text along with the name of a user who is the reviewer. Next, the electronic commercial transaction server system 12 obtains review text IDs that are related to a letter string entered as Condition 2 on the review text search condition entry page of FIG. 8, and the user IDs of the reviewers, in the same manner as in S101 (S102).

Thereafter, the electronic commercial transaction server system 12 selects one of the user IDs of the reviewers obtained in S101 (S103), and determines whether or not the selected user ID is included among the user IDs obtained in S102. In the case where the selected user ID is included, the electronic commercial transaction server system 12 obtains, from the review text IDs obtained in S102, the review text ID of a review text created by a reviewer who has the selected user ID (S104). In the case where at least one review text ID to be obtained is found in S104 (S105), the electronic commercial transaction server system 12 generates data for the review comparison field 58 about the reviewer who is identified by the user ID selected in S103, and outputs the data to a file (S106).

Specifically, the electronic commercial transaction server system 12 obtains from the user database (not shown) the name of a user who is identified by the user ID selected in S103, and outputs the user name to a file. The electronic commercial transaction server system 12 further obtains, from among the review text IDs obtained in S101, the review text ID of a review text created by a reviewer who has the output user ID, and obtains a review text and a merchandise ID that are associated with the obtained review text ID from the review text database. The electronic commercial transaction server system 12 also obtains a merchandise name, a store name, and a price that are associated with the obtained merchandise ID from the merchandise database. Thereafter, the electronic commercial transaction server system 12 generates data for a review field (for Condition 1) which displays the name of merchandise, the name of a store selling the merchandise, a price, and a review text based on the thus obtained information, and outputs the data to the file.

The electronic commercial transaction server system 12 next obtains from the review text database a review text and a merchandise ID that are associated with the review text ID obtained in S104. The electronic commercial transaction server system 12 also obtains from the merchandise database a merchandise name, a store name, and a price that are associated with the obtained merchandise ID. Thereafter, the electronic commercial transaction server system 12 generates data for a review field (for Condition 2) which displays the name of merchandise, the name of a store selling the merchandise, a price, and a review text based on the thus obtained information, and outputs the data to the file.

The electronic commercial transaction server system 12 then repeats S103 through S106 until every reviewer user ID obtained in S101 is selected (S107). After every reviewer user ID obtained in S101 is selected, the electronic commercial transaction server system 12 completes data for the review text search result page of FIG. 9 based on the file generated in S106, and then returns the data to the user computer 14 (S108). When completing the data, the electronic commercial transaction server system 12 arranges review fields that correspond to Condition 1 and review fields that correspond to Condition 2 next to each other, with the Condition 1 review fields on the left-hand side and the Condition 2 review fields on the right-hand side. In the case where the same reviewer has created a plurality of review texts about merchandise that meets Condition 1 as described above, all of the review texts may be displayed in the review fields that correspond to Condition 1 in association with one another by, for example, aligning the review tests in a single line. Alternatively, only some of the review texts (e.g., the one created last) may be displayed in the review fields that correspond to Condition 1.

In the processing of FIG. 14, review texts about merchandise that satisfies a first condition are obtained as well as the user IDs of the reviewers of the review texts. Also obtained are review texts about merchandise that satisfies a second condition and the user IDs of the reviewers of the review texts. The user IDs relevant to the first condition and the user IDs relevant to the second condition are checked for a common user ID and, when there is a common user ID, review texts created and registered by a reviewer who is identified by the common user ID are displayed next to each other in the horizontal direction. Out of review texts about merchandise that satisfies the first condition and review texts about merchandise that satisfies the second condition, those created by a common reviewer can thus be identified and output in association with one another.

Figure 15:
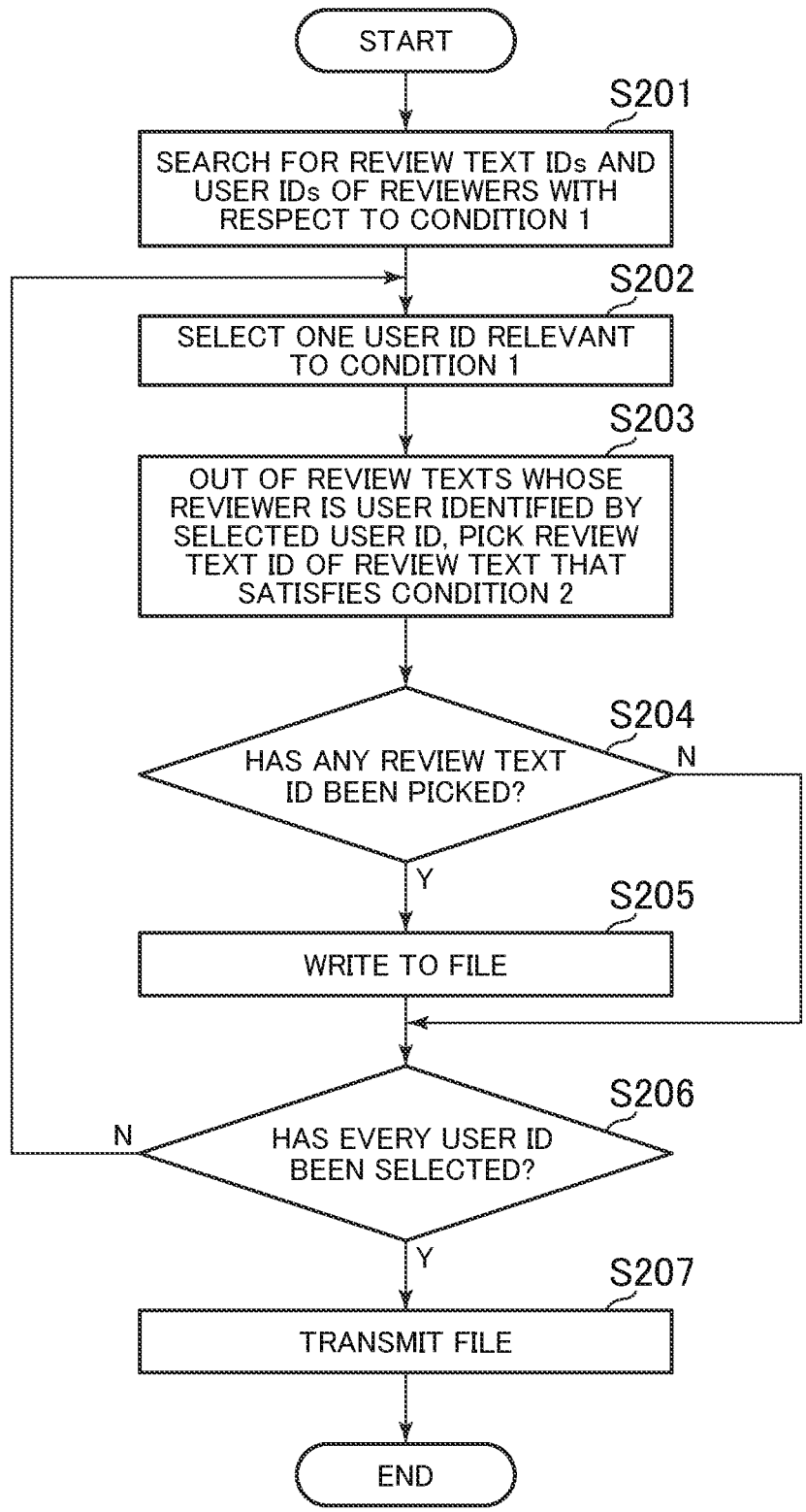
FIG. 15 A diagram illustrating a modification example of the processing of generating the data for the extended review text search result page.

FIG. 15 is a modification example of the processing of FIG. 14. In the processing of FIG. 15, the electronic commercial transaction server system 12 first obtains review text IDs that are related to a letter string entered as Condition 1 on the review text search condition entry page of FIG. 8, and the user IDs of the reviewers (S201). Specifically, the electronic commercial transaction server system 12 first obtains from the merchandise database the merchandise ID of merchandise whose merchandise name includes a letter string entered as Condition 1. The electronic commercial transaction server system 12 next obtains from the review text database a review text ID group that is associated with the obtained merchandise ID. The electronic commercial transaction server system 12 further obtains, from the review text database, for each obtained review text ID, a user ID that is associated with the review text ID and that is included in a record where the flag indicates that the option to "disclose" has been chosen.

The electronic commercial transaction server system 12 next selects one of the user IDs of the reviewers obtained in S201 (S202), and obtains the review text ID of a review text that satisfies Condition 2 from among review texts the reviewer of which is a user identified by the selected user ID (S203). Specifically, the electronic commercial transaction server system 12 searches the review text database for the merchandise ID of merchandise that is the review subject of a review text the reviewer of which is a user identified by the selected user ID, and obtains the found merchandise ID if the merchandise ID is included in a record where the flag indicates that the option to "disclose" has been chosen. The electronic commercial transaction server system 12 next determines whether or not a merchandise name that is associated with the obtained merchandise ID satisfies Condition 2. In the case where the merchandise name satisfies Condition 2, the electronic commercial transaction server system 12 obtains the review text ID of a review text the review subject of which is merchandise identified by the obtained merchandise ID and the reviewer of which is a user identified by the user ID selected in S202.

In the case where at least one review text ID to be obtained is found in S203 (S204), the electronic commercial transaction server system 12 generates data for the review comparison field 58 about a reviewer who is identified by the user ID selected in S202, and outputs the data to a file (S205). Specifically, the electronic commercial transaction server system 12 obtains from the user database (not shown) the name of a user who is identified by the user ID selected in S202, and outputs the user name to a file. The electronic commercial transaction server system 12 further obtains the review text ID of a review text created by a reviewer who is identified by the selected user ID from among the review text IDs obtained in S201, and obtains a review text and a merchandise ID that are associated with the obtained review text ID from the review text database. The electronic commercial transaction server system 12 also obtains from the merchandise database a merchandise name, a store name, and a price that are associated with the obtained merchandise ID. Thereafter, the electronic commercial transaction server system 12 generates data for a review field (for Condition 1) which displays the name of merchandise, the name of a store selling the merchandise, a price, and a review text based on the thus obtained information, and outputs the data to the file.

The electronic commercial transaction server system 12 next obtains from the review text database a review text and a merchandise ID that are associated with the review text ID obtained in S203. Also obtained from the merchandise database are a merchandise name, a store name, and a price that are associated with the obtained merchandise ID. Thereafter, the electronic commercial transaction server system 12 generates data for a review field (for Condition 2) which displays the name of merchandise, the name of a store selling the merchandise, a price, and a review text based on the thus obtained information, and outputs the data to the file.

In the case where there is no review text ID to be obtained in S203, on the other hand, the electronic commercial transaction server system 12 skips S205. The electronic commercial transaction server system 12 then repeats S202 though S205 until every reviewer user ID obtained in S201 is selected (S206). After every reviewer user ID obtained in S201 is selected, the electronic commercial transaction server system 12 completes data for the review text search result page of FIG. 9 based on the file generated in S205, and then returns the data to the user computer 14 (S207).

In the modified processing of FIG. 15, review text IDs related to merchandise that satisfies a first condition are obtained as well as the user IDs of reviewers who have created review texts identified by the review text IDs. Out of the obtained user IDs of the reviewers, the user ID of a reviewer who has created a review text about merchandise that satisfies a second condition is identified. The review text about the merchandise that satisfies the second condition which has been created by the reviewer having the identified user ID is then obtained. In this manner, too, review texts created by a common reviewer can be identified out of review texts about merchandise that satisfies the first condition and review texts about merchandise that satisfies the second condition, and can be output in association with one another.

In the description given above, the user enters two different letter strings included in a merchandise name as Condition 1 and Condition 2 respectively on his/her own on the review text search condition entry page of FIG. 8. However, the present invention is not limited to this mode. For instance, instead of selecting merchandise based on whether or not a merchandise name includes an entered letter string, the electronic commercial transaction server system 12 may allow the user to enter a merchandise ID to select merchandise that is identified by the entered merchandise ID. In this case, a merchandise ID that is the first condition may be entered by the user with a keyboard, or a merchandise ID associated with information about a specific article of merchandise, such as the name of the merchandise, may be obtained as the first condition when the information is clicked. For instance, a mode may be employed in which, with a click of the button 40 on the individual merchandise item page of FIG. 5, the merchandise ID of merchandise displayed on the page is transmitted from the user computer 14 to the electronic commercial transaction server system 12. The electronic commercial transaction server system 12 sets the transmitted merchandise ID as Condition 1. In this case, the electronic commercial transaction server system 12 is allowed to automatically set a merchandise ID that is Condition 2. For example, if the merchandise IDs of articles of merchandise that are related to each other are stored in the electronic commercial transaction server system 12 in advance, once a merchandise ID that is Condition 1 is obtained, the merchandise IDs of one or more related articles of merchandise that has been stored in association with the obtained merchandise ID can be read and set as the second condition. This way, a review text about merchandise introduced on the Web page of FIG. 5 and a review text about related merchandise that has been created by the same reviewer can be displayed immediately with a click of the button 40 on the Web page.

Figure 16:
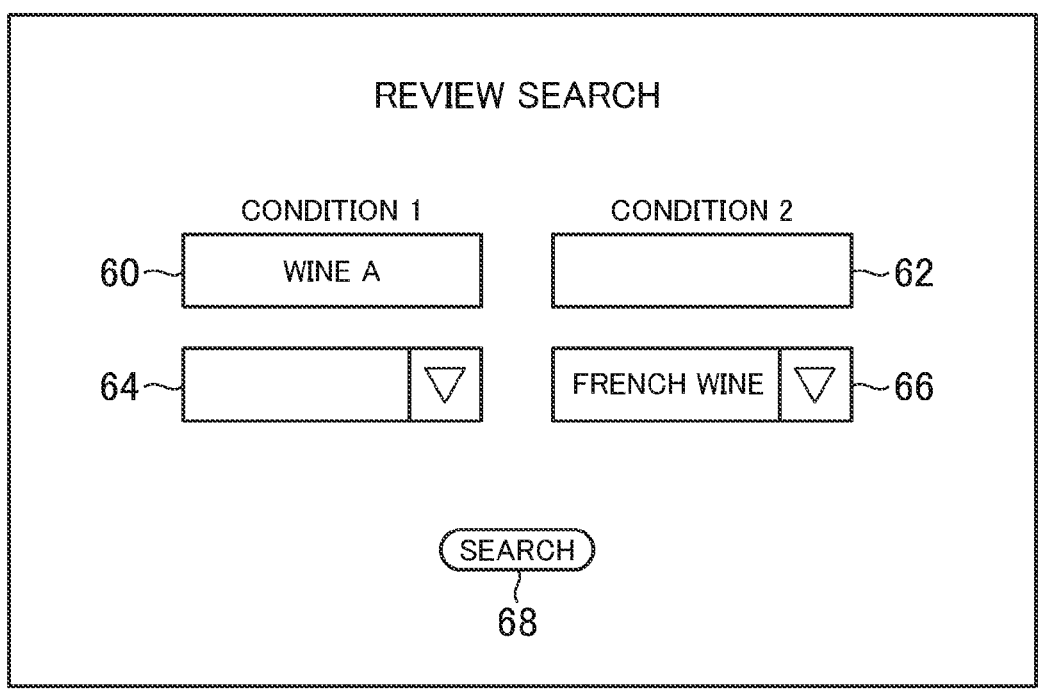
FIG. 16 A diagram illustrating a modification example of the extended review text search condition entry page.

Instead of specifying letter strings that are included in merchandise names, a root merchandise genre, an intermediate merchandise genre, or a sub-merchandise genre may be specified as the first condition and the second condition. Specifically, as illustrated in a Web page of FIG. 16, pull-down menus 64 and 66 for further selecting merchandise genres may be displayed for the first condition and the second condition, respectively, in addition to entry forms 60 and 62 for entering letter strings that are included in merchandise names. The pull-down menus 64 and 66 are each designed so as to display all sub-merchandise genres in a list format and to enable the user to specify one of the displayed genres arbitrarily. The user enters a letter string in the entry form 60, or selects one sub-merchandise genre from the pull-down menu 64, as Condition 1. The user further enters a letter string in the entry form 62, or selects one sub-merchandise genre from the pull-down menu 66, as Condition 2, and then clicks on a "search" button 68.

The electronic commercial transaction server system 12 receives Condition 1 and Condition 2, generates data for the Web page of FIG. 17, and returns the data to the user computer 14. Data for the Web page of FIG. 17 can be generated by processing similar to the one illustrated in the flow chart of FIG. 14 or FIG. 15. Specifically, when searching for merchandise that satisfies Condition 1 or Condition 2 in S101 or S102 of FIG. 14 or in S201 or S203 of FIG. 15, the electronic commercial transaction server system 12 searches for merchandise whose merchandise name includes a letter string received as Condition 1 or Condition 2 in the case where the received Condition 1 or Condition 2 is a letter string, and obtains the review text ID of a review text about the found merchandise and the user ID of the reviewer of the review text. In the case where the received condition is the specification of a sub-merchandise genre, the electronic commercial transaction server system 12 searches the merchandise database for merchandise for which the received merchandise genre is stored as "Genre 3", and obtains the review text ID of a review text about the found merchandise and the user ID of the reviewer of the review text. The rest of the processing is the same as in FIG. 14 and FIG. 15.

As illustrated in FIG. 17, according to this modification example, a review comparison field 70 is provided for each reviewer. In the review comparison field 70, a review field about merchandise whose merchandise name includes a specified letter string or merchandise that belongs to a specified sub-merchandise genre and a review field about merchandise whose merchandise name includes a separately specified letter string or merchandise that belongs to a separately specified sub-merchandise genre are arranged side by side, with the former placed on the left-hand side of the page and the latter placed on the right-hand side of the page. According to this modification example, by entering a letter string that is included in the name of merchandise in an entry form as Condition 1 and specifying as Condition 2 a sub-merchandise genre to which the merchandise belongs, the user can easily read and compare a review text about an article of merchandise with a review text about another article of merchandise that belongs to the same sub-merchandise genre and that has been created and registered by the same reviewer. Alternatively, specifying a sub-merchandise genre for Condition 1 and Condition 2 each allows the user to compare review texts about two sub-merchandise genres. For instance, the user can determine which of French wine and Italian wine to purchase by reading and comparing review texts about a sub-merchandise genre "French wines" and review texts about a sub-merchandise genre "Italian wines". A letter string of Condition 1 and a letter string of Condition 2 are displayed side by side at the top of the extended review text search result page of FIG. 17 in order to illustrate that the left-hand side review field corresponds to Condition 1 whereas the right-hand side review field corresponds to Condition 2. A word "genre" is added to the displayed letter string in the case where a sub-merchandise genre is specified as Condition 1 or Condition 2.

As described above, when a merchandise ID is used as Condition 1, the electronic commercial transaction server system 12 is allowed to automatically determine and obtain a sub-merchandise genre that is Condition 2. For instance, when a merchandise ID is specified in the entry form on the review text search condition entry page of FIG. 6 and then the "search" button 46 is clicked, the electronic commercial transaction server system 12 obtains a sub-merchandise genre to which merchandise identified by the received merchandise ID belongs from Genre 3 of the merchandise database, and uses the obtained genre as Condition 2. The user thus only needs to specify one merchandise ID in order for the electronic commercial transaction server system 12 to output a Web page as the one illustrated in FIG. 17. Needless to say, a review text search result page as the one illustrated in FIG. 17 may be output also by obtaining the merchandise ID of merchandise that is introduced on the individual merchandise item page of FIG. 5 and a sub-merchandise genre to which the merchandise belongs when the button 40 is clicked on the page, and setting the merchandise ID and the sub-merchandise genre as Condition 1 and Condition 2.

The review text search result page of FIG. 9 or FIG. 17 displays current review texts of the same reviewer about a plurality of articles of merchandise. Therefore, the premise of the page is that the same user purchases a plurality of articles of merchandise of the same type over a short period of time and creates and registers review texts about those articles of merchandise. However, it is very rare for some articles of merchandise that the same user purchases the same type a plurality of times. Wines, socks, detergents, and food, for example, are articles of merchandise that are expected to be replaced/replenished in a short period of time, whereas vacuum cleaners and refrigerators are articles of merchandise that are not expected to be replaced/replenished so often in a short period of time. The merchandise database therefore may store for each article of merchandise a flag that indicates whether or not the merchandise is expected to be replaced/replenished as illustrated in FIG. 17. The electronic commercial transaction server system 12 in this case may process only records in which the flag indicates that replacement/replenishment is expected when generating the review text search result page of FIG. 9 or FIG. 17. The processing time is thus cut short. This flag may be set manually by an administrator, or may be set automatically based on the actual purchase histories of many users. The flag may also be set for each merchandise genre (e.g., sub-merchandise genre), instead of flagging each article of merchandise.

Displaying the review comparison field in a mode that distinguishes a feature of each review text from the rest, such as highlighting, underlining, or framing the feature or using a different font or a different color for the feature, facilitates a comparison between review texts for the user. FIG. 19 illustrates a review comparison field in which features of review texts are framed. The features may be words of a specific part of speech such as adjectives, or may be fragments that match keywords stored in advance. The features may also be words of a specific part of speech or keywords that are not included in other review texts, and are displayed in a mode that distinguishes the features from the rest.

FIG. 20 is a flow chart for generating data for the review comparison field of FIG. 19. Processing of FIG. 20 is executed when display data is generated for the respective review texts in S108 of the flow chart of FIG. 14 and in S207 of the flow chart of FIG. 15. The electronic commercial transaction server system 12 first performs morphological analysis on each review text (S301). A word of a specific part of speech, for example, an adjective word, is extracted from the review text that corresponds to the first condition (S302). The electronic commercial transaction server system 12 determines whether or not the extracted word is included in the review text that corresponds to the second condition, determines the extracted word as a feature when the extracted word is not included, and performs display differentiation on the feature by highlighting or the like (S303). Similarly, a word of a specific part of speech is extracted from the review text that corresponds to the second condition (S304). The electronic commercial transaction server system 12 determines whether or not the extracted word is included in the review text that corresponds to the first condition, determines the extracted word as a feature when the extracted word is not included, and performs display differentiation on the feature by highlighting or the like (S305).

According to the electronic commercial transaction server system 12 described above, review texts about an article or articles of merchandise that respectively satisfy a plurality of search conditions are displayed by the display means of the user computer 14. In addition, review texts that have been created by a common reviewer and that respectively correspond to different search conditions are displayed in association with one another. The user can therefore easily know opinions of other users on an article or articles of merchandise that satisfy one search condition and an article or articles of merchandise that satisfy another search condition.

The system according to this embodiment is particularly effective for cases where users often compare a plurality of articles of merchandise actually bought, or cases where one article of merchandise is replaced by another article of merchandise. In the case of merchandise that is a consumable article but is not inexpensive, in particular, users would want to avoid purchasing merchandise that is not to their tastes. This embodiment enables a user to easily know opinions of other users, and thus prevents such an event.

Next, still another embodiment of the present invention is described. In the processing according to this embodiment, on a review text search condition entry page illustrated in FIG. 6, a search user (a user who obtains a search result) enters a search condition. As a result thereof, a review text search result page illustrated in FIG. 7 is displayed on the display of the user computer 14. However, this embodiment is characteristic in that a review texts of other users whose sense of evaluation on a merchandise is similar to that of the search user, that is, a similar reviewer, is selectively included in the review text search result page.

In this embodiment, as a first search condition of a merchandise, a merchandise ID of a merchandise which is an evaluation subject of a search user review text that has already been created by a search user is used. Further, as a second search condition of a merchandise, a condition entered by the search user on the review text search condition entry page illustrated in FIG. 6 is used.

In this embodiment, the electronic commercial transaction server system 12 obtains a review text about a merchandise which satisfies a first search condition (a first review text) and a review text about a merchandise which satisfies a second search condition (a second review text). Here, the first review text and the second review text are created by the same reviewer. As this reviewer, a person whose sense of evaluation on a merchandise is similar to that of the search user, that is, a similar reviewer, is selected.

Therefore, the electronic commercial transaction server system 12 obtains a review text of another reviewer on a merchandise which has already been reviewed by the search user as the first review text. Then, the degree of similarity between the first review text and the review text which has already been created by the search user is calculated. In this case, a feature vector may be generated based on a keyword used in each review text. Alternatively, it may be configured that evaluation points as to a plurality of evaluation items such as "rich sourness," "rich aroma," "rich astringency," "rich aroma of wooden barrel," and "rich flavor of fruit" are included in each review text, and a vector having each evaluation point as a constituent is set as a feature vector of the review text. The electronic commercial transaction server system 12 may set a distance between feature vectors as the degree of similarity between the first review text and the review text which has been created by the search user.

The electronic commercial transaction server system 12 selects a similar reviewer from among reviewers who created a review text on both a merchandise which satisfies the first search condition and a merchandise which satisfies the second search condition based on the degree of similarity calculated this way. For example, one or more reviewers who created the first review text having the largest one of the above degree of similarity may be selected, and one or more reviewers who created the first review text having the above degree of similarity equal to or more than a predetermined threshold value may be selected.

The electronic commercial transaction server system 12 generates data for displaying the second review text created by the similar reviewer selected this way in the form of the review text search result page illustrated in FIG. 7, and returns it to the user computer 14.

Thus, according to this embodiment, the second review text by the similar reviewer is selectively included in the review text search result page. As a result thereof, the second review text which is beneficial to the search user can be selectively displayed.

Note that the merchandise ID used as the first search condition may be an ID of a merchandise which has already been purchased by the search user. This way, a similar reviewer can be identified based on a review text on a merchandise which the search user actually purchased. Further, the merchandise ID used as the first search condition may be an ID of a merchandise which belongs to a genre same with that of a merchandise that satisfies the second search condition. This way, a second review text by a reviewer whose sense of evaluation on a merchandise which belongs to the genre same with that of the merchandise that satisfies the second search condition is similar to the search user can be displayed, which makes the review text search result page more beneficial.

Note that the review text search result page may contain the first review text of each of similar reviewers. In this case, as illustrated in FIG. 9, it is desirable to arrange the first review text and the second review text side by side or on top of one another and associate them with one another for each similar reviewer. This way, the search user can see if the similar reviewer truly has a sense of evaluation similar to his by reading the first review text.

Figure 21:
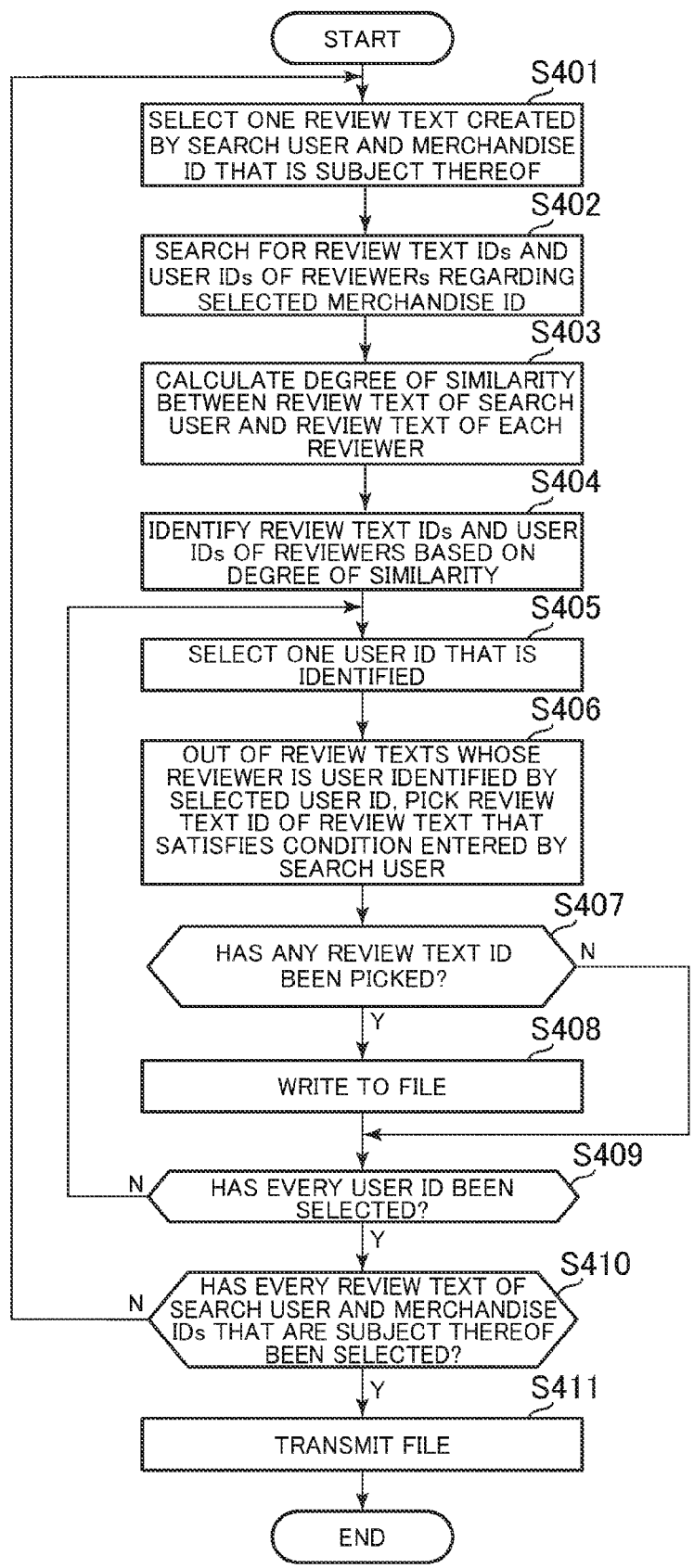
FIG. 21 A flow chart illustrating processing of generating data for the review text search result page according to another embodiment of the present invention.

FIG. 21 is a flow chart illustrating processing of generating data for a review text search result page according to this embodiment. The processing illustrated in this figure is executed by the electronic commercial transaction server system 12. In this processing, in the beginning, one pair of a review text which has already been created by a search user and an ID of a merchandise which is a subject of that review text is selected (S401). Specifically, in the review text database illustrated in FIG. 12, a record, a user ID of the search user is in the "user ID of reviewer" field of which, is extracted. Here, it may be configured that only records in which "1" meaning that a reviewer actually purchased the merchandise is set in "purchaser flag" are extracted. Further, it may be configured that only records including a merchandise ID of a merchandise whose genre is the same with that of a merchandise that satisfies a search condition entered in the review text search condition entry page illustrated in FIG. 6 are extracted. Then, one of the extracted records is selected, and a pair of the review text and the merchandise ID is obtained.

Next, the electronic commercial transaction server system 12 searches for review text IDs, review texts and user IDs of reviewers using the obtained merchandise ID as the search condition (S402). Specifically, the electronic commercial transaction server system 12 extracts records which are associated with the merchandise ID obtained in S401 and are associated with a flag of "disclosure". Then, review text IDs, review texts and user IDs are obtained from the extracted records.

Next, the electronic commercial transaction server system 12 calculates the degree of similarity between the review text selected in S401 (the selected user review text) and each review text obtained in S402 (S403). Then, some of sets of review text IDs, review texts and user IDs are identified based on the calculated degrees of similarity (S404). In this case, sets of review texts having the degree of similarity equal to or more than a predetermined value, their review text IDs and user IDs are selected. Alternatively, a set of a review text having the largest degree of similarity, its review text ID and user ID is selected.

Next, the electronic commercial transaction server system 12 selects one of the user IDs of the reviewers identified in S404 (S405), and from among review texts a reviewer of which is a user of the selected user ID, the electronic commercial transaction server system 12 obtains review text IDs of those satisfying a search condition entered in the review text search condition entry page illustrated in FIG. 6 (S406). Specifically, the electronic commercial transaction server system 12 obtains, from the review text database, merchandise IDs of merchandises which are review subjects of review texts whose reviewer is a user of the selected user ID and which are included in a record where the flag indicates that the option to "disclose" has been chosen. Next, the electronic commercial transaction server system 12 determines whether or not merchandise names that are associated with the obtained merchandise IDs satisfy the entered search condition. Then, if they satisfy the search condition, the electronic commercial transaction server system 12 obtains review text IDs of review texts whose review subjects are merchandises of those merchandise IDs and whose reviewer is a user of the user ID selected in S405.

If there is at least one review text ID obtained in S406 (S407), the electronic commercial transaction server system 12 outputs review texts of the reviewer having the user ID selected in S405 to a file (S408).

Meanwhile, in S407, if there is no review text ID obtained in S406, the electronic commercial transaction server system 12 skips the processing of S408. Thereafter, the electronic commercial transaction server system 12 repeats the processing of S405 through S408 until all of the user IDs of the reviewers obtained in S402 are selected. Once all of the user IDs of the reviewers obtained in S402 are selected, then it determines whether or not all of the review texts of the search user and their merchandise IDs have been selected in S401 (S410), and repeats the processing of S401 through S409 until all of them are selected. Thereafter, based on the file generated in S408, data of the review text search result page illustrated in FIG. 7 is generated, and it is returned to the user computer 14 (S411).

According to the above embodiment, review texts of other users whose sense of evaluation on a merchandise is similar to that of the search user, that is, similar reviewers, can be selectively included in the review text search result page, which can make it a page beneficial to the search user.

Figure 22:
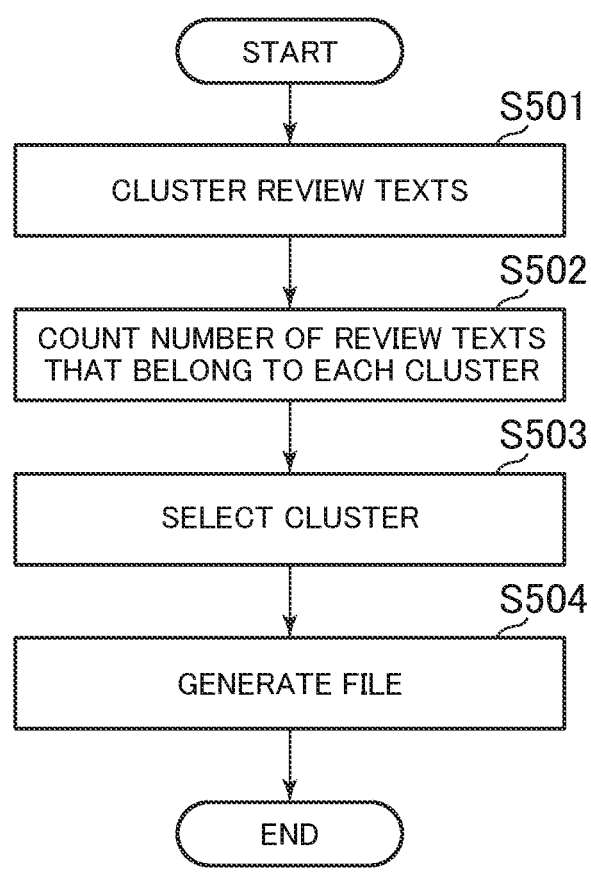
FIG. 22 A flow chart illustrating processing of narrowing down the review text search.

FIG. 22 is a flow chart illustrating processing selectively added prior to S411 of FIG. 21, and illustrates processing of narrowing down review texts included in the review text search result. In the processing illustrated in this figure, a clustering of all the review texts output in S408 of FIG. 21 is performed (S501). For example, the feature vector described above is generated for each of the review texts, and the review texts are clustered using the feature vectors. Then, a number of review texts belonging to each cluster is counted (S502), and one or more clusters are selected depending on the number (S503). For example, a cluster having the largest number of review texts may be selected, and all the clusters to which a predetermined number or more of review texts belong may be selected. Thereafter, based on review texts which belong to the selected cluster, data of the review text search result page illustrated in FIG. 7 is generated. Data generated this way is returned to the user computer 14.

According to the above processing, a review text is included in review text search result data only in the case where there are many similar review texts of it, and as a result thereof a review text having a highly reliable content is selectively presented to a search user.

Note that the present invention is not limited to the embodiments described above.

For instance, while the description given above deals with only manufactured articles of merchandise as commercial transaction objects, the present invention can similarly be applied to services such as providing a hotel, an inn, or other lodging facilities, or offering a chance to use a golf course, and the trading of information such as movies or other types of video data, or news or other types of text data.

In the description given above, a review text is output by transmitting and outputting data for a Web page that displays the review text to the user computer 14, and displaying the data on the display means of the user computer 14. However, the present invention can use any format for data transmitted from the electronic commercial transaction server system 12 to the user computer 14, and can use any output format on the user computer 14. For instance, the user computer may print a review text.

In the description given above, review texts respectively corresponding to two search conditions are output in association with each other. Instead, review texts respectively corresponding to three or more search conditions may be output in association with one another.

The invention claimed is:

1. A review text output system, comprising:
at least one processor; and
at least one memory storing a plurality of instructions that, when executed by the at least one processor, cause the at least one processor to perform operations comprising:
obtaining a first condition, which is a search condition for searching one or more commercial transaction objects;
obtaining a second condition, which is a search condition for searching one or more commercial transaction objects;
identifying one or more first review texts about one or more commercial transaction objects that satisfy the first condition and one or more second review texts about one or more commercial transaction objects that satisfy the second condition, the first review texts and the second review texts being created by a common reviewer; and
outputting the second review texts,
wherein the first condition indicates a commercial transaction object associated with a search user review text which has already been created by a search user,
wherein the identification of the first review texts and the second review texts comprises a calculation of a feature vector to determine a degree of similarity between the search user review text and the first review texts, and
wherein the calculation of the feature vector is based on a keyword used in both the search user review text and the first review text.

2. The review text output system according to claim 1, wherein the commercial transaction object indicated by the first search condition is an item which has already been purchased by the search user.

3. The review text output system according to claim 1, wherein the commercial transaction object associated with the search user review text belongs to a same genre as a genre of the commercial transaction object that satisfies the second condition.

4. The review text output system according to claim 1, wherein the second condition is entered by the search user.

5. The review text output system according to claim 1, further comprising:
a display apparatus, wherein
the at least one processor is configured to output the first review texts and the second review texts to the display apparatus, and
the first review texts and the second review texts are arranged adjacent to each other on the display apparatus.

6. The review text output system according to claim 5, wherein the first review texts and the second review texts are arranged side-by-side on the display apparatus.

7. A review text output system according to claim 1, wherein the identification of the first review texts and the second review texts comprises a classification of the second review texts into a plurality of clusters, and a selection of one or more of the plurality of clusters based on a number of the second review texts that are classified into each of the clusters, and an identification of some or all of the second review texts that are classified into a selected one of the clusters.

8. A review text output method, comprising:
a step of obtaining a first condition, which is a search condition for searching commercial transaction objects, using at least one processor;
a step of obtaining a second condition, which is a search condition for searching commercial transaction objects, using the at least one processor;
a step of identifying one or more first review texts about one or more commercial transaction objects that satisfy the first condition and one or more second review texts about one or more commercial transaction objects that satisfy the second condition using the at least one processor, the first review texts and the second review texts being created by a common reviewer; and
a step of outputting the second review texts using a display;
wherein the first condition indicates a commercial transaction object associated with a search user review text which has already been created by a search user,
wherein in the step of identifying, the first review texts and the second review texts are identified based on a degree of similarity between the search user review text and the first review texts,
wherein the degree of similarity is calculated based on a feature vector, and
wherein the feature vector is generated based on a keyword used in the search user review text and the first review text.

* * * * *